May 2, 1933.  J. SOSS  1,906,648
METHOD OF MAKING HINGES
Filed April 18, 1931
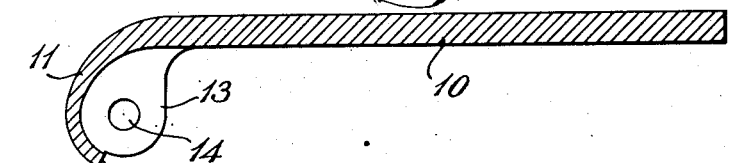
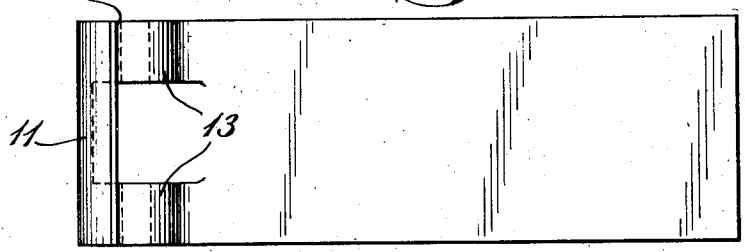
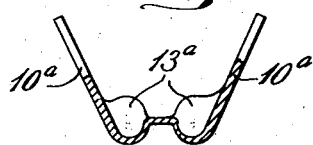 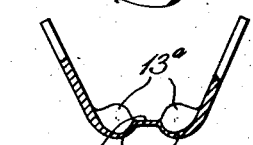
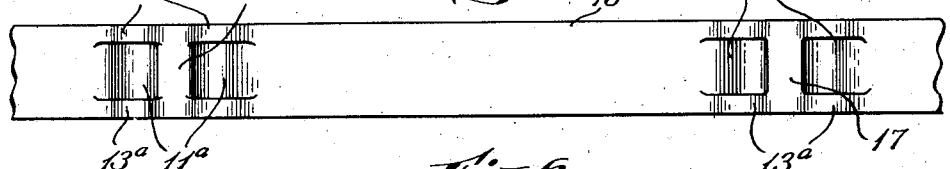
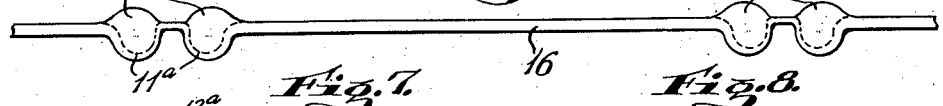
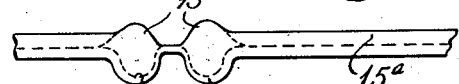 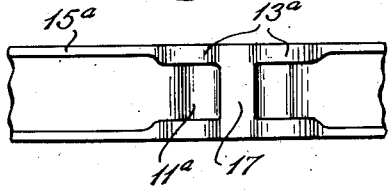
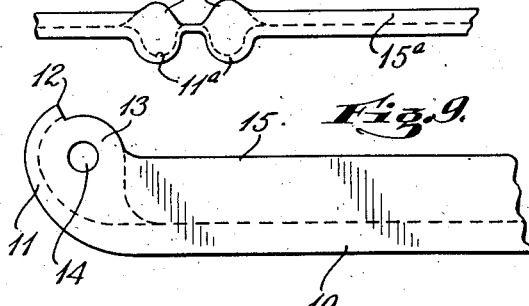
INVENTOR.
JOSEPH SOSS
BY Howard E. Thompson
ATTORNEY Patented May 2, 1933

1,906,648

UNITED STATES PATENT OFFICE

JOSEPH SOSS, OF ROSELLE, NEW JERSEY

METHOD OF MAKING HINGES

Application filed April 18, 1931. Serial No. 531,034.

This invention relates to the method of making hinges, and particularly to the manufacture of hinge butts of the covered joint type including a curved hood portion at one end of the butt and side walls for the curved hood portion integral therewith and with the attaching plate of the butt; and the object of the invention is to provide a novel method of forming the workpieces or strips from which hinge butts having curved hood portions at one end are adapted to be formed, and particularly in forming from the strips or workpieces pairs of similar hinge butts; a further object being to provide strips or workpieces in the manufacture of hinge butts of the class specified, including means for forming side flange walls to the attaching plate portion of the hinge butt; and with these and other objects in view, the invention consists in a method of manufacturing hinge butts more fully hereinafter described and claimed.

The invention is fully disclosed in the following specification, of which the accompanying drawing forms a part, in which the separate parts of my improvement are designated by suitable reference characters in each of the views, and in which:—

Fig. 1 is a longitudinal, sectional view through a hinge butt made according to my invention.

Fig. 2 is a face view of the butt shown in Fig. 1.

Fig. 3 shows one step in forming a pair of hinge butts from a strip or workpiece.

Fig. 4 shows a further step in the method of forming the hinge butts.

Fig. 5 is a plan view of one form of strip or workpiece which I employ.

Fig. 6 is a side edge view of the structure shown in Fig. 5.

Fig. 7 is a view similar to Fig. 6 showing only a part of the construction and showing a modification.

Fig. 8 is a plan view of the strip shown in Fig. 7; and,

Fig. 9 is a side edge view of a hinge butt made from the strip or workpiece shown in Fig. 7.

In Figs. 1 and 2 of the drawing, I have shown one form of hinge butt made according to my invention. In said figure, 10 represents the attaching plate portion of the butt, 11 the curved hood portion terminating in a stop shoulder 12, said hood portion having comparatively thick side walls 13 enclosing the sides of the curved hood portion, said walls forming pintle bearings for the pintle pin of a hinge and having apertures 14 for such pins. The structure shown in Fig. 9 differs from that shown in Figs. 1 and 2 simply in the addition of side flange walls 15, which are integral with the side edges of the attaching plate portion 10 and with the walls 13, it being understood that the thickness of the flange walls 15 is preferably considerably less than the thickness of the walls 13.

In carrying my improved method into effect, I provide an elongated, strip-like body or workpiece 16 which may be formed by a rolling process in rolling the stock at the mills, or by the use of suitable forming dies so as to provide on predetermined spaced sections or areas of the strip or workpiece, adjacent semi-circular depressions 11a which partially form the curved hood portion 11 in the process of forming the hinge butt. At each side of the depressions 11a are formed comparatively heavy wall portions 13a which provide the metal in forming the side walls or bearings 13 at the hood end portion of the butt. The section 17 intermediate the depressions forms a coupling or binding flange which supports the pair of butts together in the process of forming a pair of hinge butts in one die forming operation as later described. These connecting sections are severed and removed in forming the independent butts of each pair.

It will be noted upon a consideration of Fig. 6 of the drawing, that the wall portions 13a are raised with respect to the upper face of the longitudinal plane of the strip, thus providing sufficient metal in the strip or workpiece to facilitate the formation of the wide bearings 13 of the resulting hinge butt.

The strip or workpiece shown in Figs. 5 and 6 is designed primarily for making butts similar to that shown in Figs. 1 and 2 and in the steps of operation indicated in Figs. 3 and 4. But, in producing hinge butts such as shown in Fig. 9, a strip similar to that shown in Figs. 7 and 8 is employed. This strip differs from the strip shown in Figs. 5 and 6 simply in the addition of flanged walls 15a at the sides of the strip and extending from the wall portions 13a. Otherwise, the strip shown in Figs. 7 and 8 is identical with that shown in Figs. 5 and 6.

After obtaining the strips or workpieces which may be subdivided into independent parts suitable for forming one pair of hinge butts, or used in the form of a continuous strip in forming pairs of hinge butts in a continuous series of forming operations, the section of the workpiece including the depressions 11a and walls 13a is fashioned to extend the parts arranged outwardly of each depression 11a angularly with respect to each other, said parts being designated by the reference character 10a, the same forming the attached plate portions of the finished hinge butt. The result of this forming operation is substantially illustrated in Fig. 3 of the drawing, and will be performed by the use of suitable dies.

In this operation, the partial shaping of the hood portion as well as the side walls may be performed, after which the workpiece may be fashioned by the use of suitable dies to upset the side walls 13a of the strip to a finished size, in which operation, the metal of the wall portions 13a is compacted to form comparatively wide wall or bearing portions 13 of the butt. At the same time, the hood portions 11a are fashioned to the finished size and form represented in the resulting butt as shown in Figs. 1 and 2.

After the workpiece has been fashioned in the manner shown in Fig. 4, the joining or coupling section or fin 17 is severed, thus forming two similar butt parts with hood portions at one end thereof similar to the butt shown in Figs. 1 and 2. These butts are finished in the usual manner and the pintle holes 14 are drilled or otherwise formed in the walls or bearings 13.

It will be understood that I may also make my improved hinges from the strips or workpieces disclosed, in a single operation. In other words, the strip as shown in Figs. 5 and 6 or that shown in Figs. 7 and 8 may be fashioned to produce the result shown in Fig. 4 in one forming operation in the production of the hinge butts shown in Figs. 1 and 2 and Fig. 9, eliminating the intermediate operation of partial forming indicated in Fig. 3 of the drawing.

It will be further understood that the formation of my hinge in accordance with the method herein set forth may be made under the hot or cold process as may be desired, depending largely upon the character of the resulting product or hinge butt, it being preferable to use the hot process when comparatively heavy walls are employed in the bearing 13.

It will be understood that my invention is not limited to the specific shape and contour of the strips or workpieces herein disclosed, as these strips are merely suggestions as to the general form and structure of a strip or workpiece which may be used in the manufacture of hinges of the class under consideration in accordance with my method.

The distinctive feature of the invention resides in the provision of an elongated preformed strip or workpiece having adjacently arranged curved recesses or depressions joined by a connecting fin, said depressions being spaced longitudinally of the workpiece, thereby facilitating the formation of the strip or workpiece in the manner herein set forth, obviating the necessity of using a plain bar or sheet which must be partially formed or blanked, and then afterwards passed through the several shaping and forming operations which may be necessary in the production of the resulting product.

While a slight additional cost would result from the formation of the particular strips or workpieces herein disclosed, this added cost would be slight as compared with the cost of blanking and shaping other workpieces in accordance with known processes. Various other changes in and modifications of the method herein shown and described may be made within the scope of the appended claims, without departing from the spirit of my invention or sacrificing its advantages.

Having fully described my invention, what I claim as new and desire to secure by Letters Patent, is:

1. The herein described method of making hinge butts having curved hood portions disposed at one end thereof, which consists in providing an elongated strip having spaced pairs of semi-cylindrical depressions including side walls, the axis of said depressions being transverse to the length of the strip, then shaping that section of the strip having said depressions to further fashion said depressions and side walls to form of the depressions curved hood portions including side walls with attaching plates extending from said hood portions in angular relation with respect to each other, the hood portions being joined by connecting fins and then severing said connecting fins and said attaching plates to form a plurality of similar hinge butts including curved hood portions having side walls disposed at one end of each of said butts.

2. The herein described method of making hinge butts having curved hood portions disposed at one end thereof, which consists in providing an elongated strip having spaced pairs of semi-cylindrical depressions including side walls, the axis of said depressions being transverse to the length of the strip, then shaping that section of the strip having said depressions to further fashion said depressions and side walls to form of the depressions curved hood portions including side walls with attaching plates extending from said hood portions in angular relation with respect to each other, the hood portions being joined by connecting fins and then severing said connecting fins and said attaching plates to form a plurality of similar hinge butts including curved hood portions having side walls disposed at one end of each of said butts, and then forming pintle apertures in the side walls of the hood portion.

3. The herein described method of making hinge butts of the class specified, which consists in providing an elongated strip-like workpiece having pairs of semi-cylindrical offset portions including side walls disposed on predetermined sections thereof, the axis of said offset portions being transverse to the length of said strip, removing a section of the workpiece including a pair of said offset portions, then further fashioning that part of said removed section having the offset portions and side walls to form of each offset a curved hood portion including side walls with attaching plate portions extending angularly with respect to each other from said hood portions, and then severing the product thus formed intermediate the hood portions to provide independent and similar hinge butts having curved hood portions and side walls disposed at one end thereof.

4. The herein described method of making hinge butts of the class specified, which consists in providing an elongated strip-like workpiece having pairs of semi-cylindrical offset portions including side walls disposed on predetermined sections thereof, said strip including side flanges arranged in alinement with said side walls and longitudinally of said strip, the axis of said offset portions being transverse to the length of said strip, removing a section of the workpiece including a pair of said offset portions, then further fashioning that part of said removed section having the offset portions and side walls to form of each offset a curved hood portion including side walls with attaching plate portions extending angularly with respect to each other from said hood portions, and then severing the product thus formed intermediate the hood portions to provide independent and similar hinge butts having curved hood portions and side walls disposed at one end thereof.

5. The herein described method of making hinge butts of the class described which consists in forming a workpiece to provide an elongated, strip-like body having on predetermined sections thereof pairs of semi-cylindrical depressions including side walls, the depressions in each pair being arranged in juxtaposition, then further shaping the depressions, side walls and adjacent portions of the strip body to form adjacent hood portions having comparatively thick side walls, and then severing the workpiece thus formed intermediate the hood portions in said pairs and also intermediate the pairs of hood portions to form independent butts each having a curved hood portion including side walls disposed at one end thereof.

6. The herein described method of making hinge butts of the class described which consists in forming a workpiece to provide an elongated, strip-like body having on predetermined sections thereof pairs of semi-cylindrical depressions including side walls, the depressions in each pair being arranged in juxtaposition, then further shaping the depressions, side walls and adjacent portions of the strip body to form adjacent hood portions having comparatively thick side walls, then severing the workpiece thus formed intermediate the hood portions in said pairs and also intermediate the pairs of hood portions to form independent butts each having a curved hood portion including side walls disposed at one end thereof, forming the side walls of the hood portions so as to provide finished, parallel, inner opposed surfaces, and then forming pintle apertures in said side walls.

In testimony that I claim the foregoing as my invention I have signed my name this 17th day of April, 1931.

JOSEPH SOSS.